H. R. FRANCIS.
COTTER PIN.
APPLICATION FILED DEC. 12, 1919.

1,379,908.

Patented May 31, 1921.

WITNESSES

INVENTOR
H. R. FRANCIS.
BY
ATTORNEYS

UNITED STATES PATENT OFFICE.

HAROLD ROBERT FRANCIS, OF LOS ANGELES, CALIFORNIA, ASSIGNOR OF ONE-HALF TO PETER W. FRANCIS, OF MUSCATINE, IOWA.

COTTER-PIN.

1,379,908.   Specification of Letters Patent.   Patented May 31, 1921.

Application filed December 12, 1919. Serial No. 344,323.

*To all whom it may concern:*

Be it known that I, HAROLD R. FRANCIS, a citizen of the United States, and a resident of Los Angeles, in the county of Los Angeles and State of California, have invented a new and Improved Cotter-Pin, of which the following is a full, clear, and exact description.

This invention relates to improvements in cotter pins, an object of the invention being to provide a cotter pin composed of two independent separable interlocking members.

A further object is to provide a cotter pin in which the two members are constructed precisely alike but are reversely positioned and insure a perfect lock holding the parts against possibility of disconnection either because of vibration or because of contact with another part, and at the same time provide a device that can be readily assembled or taken apart without special tools.

With these and other objects in view the invention consists in certain novel features of construction, and combinations and arrangements of parts as will be more fully hereinafter described and pointed out in the claims.

In the accompanying drawings—

Figure 1:
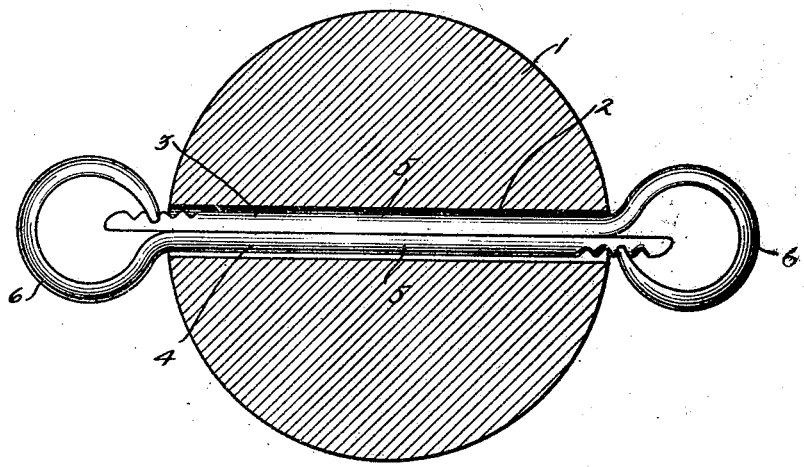
Figure 1 is a view in cross-section through a bolt or other device showing my improved cotter pin in operative position.
Figure 2:
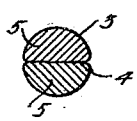
Fig. 2 is a view in transverse section through the cotter pin.
Figure 4:
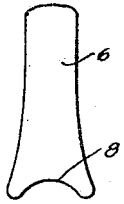
Fig. 4 is a plan view of the other end of the cotter pin member.
Figure 3:
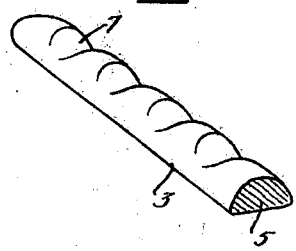
Fig. 3 is a fragmentary perspective view of one end of a cotter pin member.

1 represents a bolt or other device having an opening 2 therein. It is, of course, to be understood that my device is adapted for any purpose for which cotter pins are ordinarily employed.

My improved cotter pin comprises two members 3 and 4, both constructed precisely alike and of metal such as commonly employed in the making of cotter pins. The members 3 and 4 throughout the greater portion of their length are straight, as shown at 5, but at one end are bent forming a curved spring tongue 6 which constitutes an eye. The straight portions 5, 5, are of semi-cylindrical shape in cross-section with the flat inner faces of the two members together so that externally the pin, when assembled, is cylindrical. The free ends of the straight portions 5 are made on their outer faces with a longitudinal series of notches 7 to be engaged by the spring tongues 6 of the other cotter pin member. These spring tongues 6 are preferably flared at their free ends and recessed, as shown at 8, to conform in shape in cross-section to the cotter pin members and to provide an extended bearing surface in the notch.

As shown clearly in Fig. 1, the members of the cotter pin are reversely positioned and are inserted into the bolt 1, or other article, from opposite sides so that the spring tongues 6 of both members are sprung into notches of the other member and by forcing these members longitudinally, the length of the cotter pin is adjusted to suit conditions. The cotter pin can be removed by longitudinal force applied to the members to pull them apart or by the entrance of a suitable tool into the eye portions 6 to spring the tongues out of engagement with the notches.

It will also be noted that with my improved cotter pin the parts are not injured by use and can be employed indefinitely, nor is the pin mutilated or bent in locking or unlocking destroying its further usefulness. Furthermore, a strong gripping action is had of the two members with each other to prevent disconnection due to vibration or due to blows of any sort. As a matter of fact, a blow upon either end of the cotter pin would only tend to tighten the same and not disconnect it.

The two members of the cotter pin being constructed precisely alike results in a cheapness of manufacture and insures a perfect coöperation of the two members when assembled.

It is, of course, to be understood that the cotter pin will be made of such sizes as to suit the trade and can be placed in position and removed without the employment of any particular tools for the purpose.

Various slight changes may be made in the general form and arrangement of parts described without departing from the invention, and hence I do not limit myself to the precise details set forth, but consider myself at liberty to make such changes and alterations as fairly fall within the spirit and scope of the appended claims.

I claim:

1. As a new article of manufacture, a cotter pin comprising a pair of members, said members comprising straight portions having notches therein adjacent one end, integral curved tongues on the other ends of said members, and said members being identical.

2. A cotter pin, comprising two independent members, each member having a straight portion of semi-cylindrical form in cross-section, the two straight portions adapted to be located side by side, each straight portion having at its free end a series of notches, and an integral curved spring tongue on the free end of each member adapted to spring into a notch of the other member.

3. A cotter pin, comprising two independent members, each member having a straight portion of semi-cylindrical form in cross-section, the two straight portions adapted to be located side by side, each straight portion having at its free end a series of notches, and an integral curved spring tongue on the free end of each member, said tongues having recesses flared free ends adapted to be positioned in a notch of the other member.

4. A cotter pin, comprising two independent members, each member comprising a straight portion and a curved end, the curved end of one member adapted to interlock with the straight portion of the other member when the straight portions of the two members are located side by side.

HAROLD ROBERT FRANCIS.